United States Patent [19]

Lewis et al.

[11] Patent Number: 5,046,391
[45] Date of Patent: Sep. 10, 1991

[54] SAW MILL

[76] Inventors: David J. Lewis, Location 1423, Barrabup Rd.; Kevin R. Inkster, Forrest Street, both of Nannup, Western Australia, Australia

[21] Appl. No.: 572,350

[22] Filed: Aug. 27, 1990

Related U.S. Application Data

[63] Continuation of Ser. No. 353,805, May 17, 1989, abandoned.

[30] Foreign Application Priority Data

May 19, 1988 [AU] Australia .................. PI8336

[51] Int. Cl.$^5$ .................................. B27B 7/00
[52] U.S. Cl. ...................... 83/489; 83/471.3; 83/485; 83/578; 144/376; 144/378
[58] Field of Search ........... 83/574, 578, 627, 483, 83/477.1, 473, 472, 743, 794, 753, 795, 928, 487, 489, 488, 486.1, 477, 471.3, 821; 144/376, 378

[56] References Cited

U.S. PATENT DOCUMENTS

| | | | |
|---|---|---|---|
| 487,116 | 11/1892 | Ehrhardt | 83/488 |
| 566,624 | 8/1896 | Sager | 83/488 |
| 1,842,114 | 1/1932 | Pratt | 83/488 |
| 3,747,457 | 7/1973 | Thompson | 83/928 X |
| 3,926,086 | 12/1975 | Crane | 83/795 X |
| 4,078,460 | 3/1978 | Bowman | 83/488 X |
| 4,104,994 | 8/1978 | Janssen | 83/488 X |
| 4,584,918 | 4/1986 | Stubbe et al. | 83/471.3 |
| 4,640,170 | 2/1987 | Bakken | 83/574 X |
| 4,660,454 | 4/1987 | Elsey | 83/574 X |
| 4,676,130 | 6/1987 | Nutt | 83/488 X |

FOREIGN PATENT DOCUMENTS 145466  11/1948  Australia .

Primary Examiner—Frank T. Yost
Assistant Examiner—Rinaldi Rada
Attorney, Agent, or Firm—Dorsey & Whitney

[57] ABSTRACT

A portable saw mill for cutting timber from rough logs. The saw mill having a frame comprises a pair of beams supported only at the respective ends thereof, each beam including a rail extending longitudinally of the beams, said rails being parallel and located in a common horizontal plane. A motor and saw assembly mounted on the rails for linear movement therealong and including a motor coupled to a circular saw blade to drive same, and the saw blade being adjustable between at least two positions in each of which the axis of rotation of the saw is at right angles to the direction of linear movement of the motor and saw assembly.

17 Claims, 4 Drawing Sheets

SAW MILL

This is a continuation of application Ser. No. 07/353,805 filed May 17, 1989 now abandoned.

This invention relates to a saw mill for sawing timber and is particularly applicable to a portable saw mill for use in cutting rough timber into lengths of regular cross-section on site, such as in the bush or forest.

Currently, rough logs of timber are normally transported to a saw mill complex for the purpose of cutting the rough log into lengths of timber of regular shape. Apart from the heavy equipment required to transport the rough logs to the site of the saw mill complex, such complexes are high capital cost investments and therefore an appropriate supply of rough logs within an acceptable transporting distance must be available. However, there are timber users who only require limited supplies of sawn lengths of regular shaped timber, and areas of limited supply of rough logs, where it is not economic to provide a saw mill complex and/or the transport required for the rough logs.

The conventional chain saw can be used for cutting lengths of timber of regular sections from rough logs at on-site locations, however, a high degree of skill is required to cut such lengths of timber from logs using a hand held chain saw.

It is therefore the object of the present invention to provide a saw mill of a portable nature which may be operated at bush sites for the cutting of length of regular sectioned timber from rough logs.

With this object in view, there is provided according to the present invention a saw mill for cutting timber, having a motor and saw assembly mounted for linear movement along a support frame, said assembly including a motor coupled to a circular saw blade to drive same, and at least said saw blade is selectively adjustable between at least two positions in each of which the axis of rotation of the saw is at right angles to the direction of said linear movement, and the saw blade remains drive coupled to the motor.

Conveniently, the saw blade is coupled to the motor so that the saw blade may move between two positions, wherein the saw blade rotates in respective right angular related planes. Preferably the saw blade pivots about an axis parallel to the direction of linear movement and so that cuts made by the saw blade in said respective right angular planes will intersect. This intersecting of the saw cuts may be achieved if the pivot axis of the saw blade is at right angles to the axis of rotation of the saw blade and spaced from the plane of rotation of the saw blade by a distance less than half the diameter of the saw blade.

Preferably the saw blade is coupled to the motor so that it may be operated in three independent positions with the planes in which the blade rotates in two of those positions being parallel and the plane of rotation in the third position being at right angles to each of the other two planes of rotation.

In one construction, the motor, which may be an internal combustion engine, does not move during the adjustment of the position of the saw blade, and a bevel gear drive may be interposed between the motor and the saw blade to enable the blade to be moved to the respective angular related positions whilst maintaining the drive between the motor and the saw blade. Alternatively the motor and saw blade may be coupled to pivot as a unit between the respective angularly related positions of the saw blade. The saw blade may be direct coupled to the The invention will be more readily understood from the following description of one practical arrangement of the saw mill with reference to the accompanying drawings.

Figure 1:
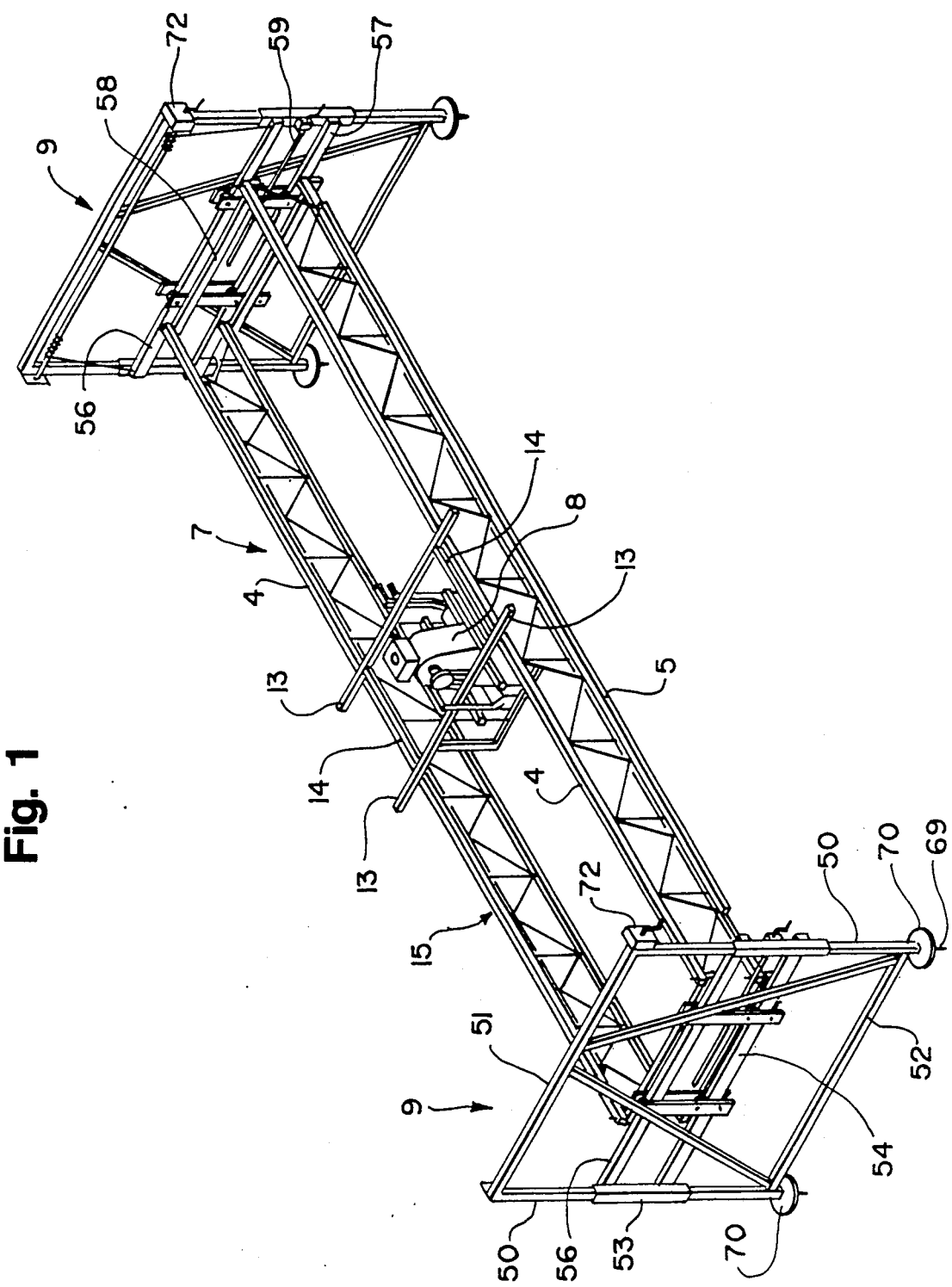
FIG. 1 is a perspective view of the portable saw bench.

Referring now to the drawings, the longitudinal frame 7 comprises a pair of fabricated parallel beams 15 each of generally triangular cross section, and of open truss construction. The beams 15 are each arranged with one side 6 of each directed inwardly towards the other and each vertical, with the apex 5 of each beam directed outwardly. The beams 15 thus have rigidity and strength in both the horizontal and vertical directions. The beams 15 are supported in spaced relation only at each end, as hereinafter described, to provide a completely open space therebetween extending substantially the whole length of the beams. The upper member of each beam 15 is continuous and provides a track 4, extending the length of the beam 15, that supports the motor and saw assembly 8 as hereinafter described.

The motor and saw assembly 8 comprise a rigid transport frame 10 having an underslung sub-frame 11 upon which the internal combustion engine 12 is mounted. The frame 10 is of a box-like construction, having a pair of support bars 13, spaced apart in the direction of travel of the assembly along the beams 15 and a pair of cross-bars 14 interconnecting the support bar 13.

Figure 8:
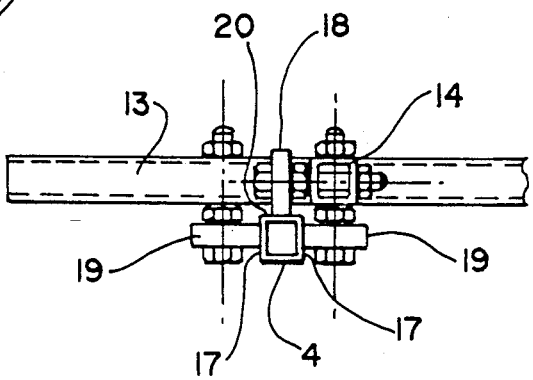
FIG. 8 is a detailed view of one of the wheel assemblies supporting the frame carrying the motor and saw assembly.
Figure 7:
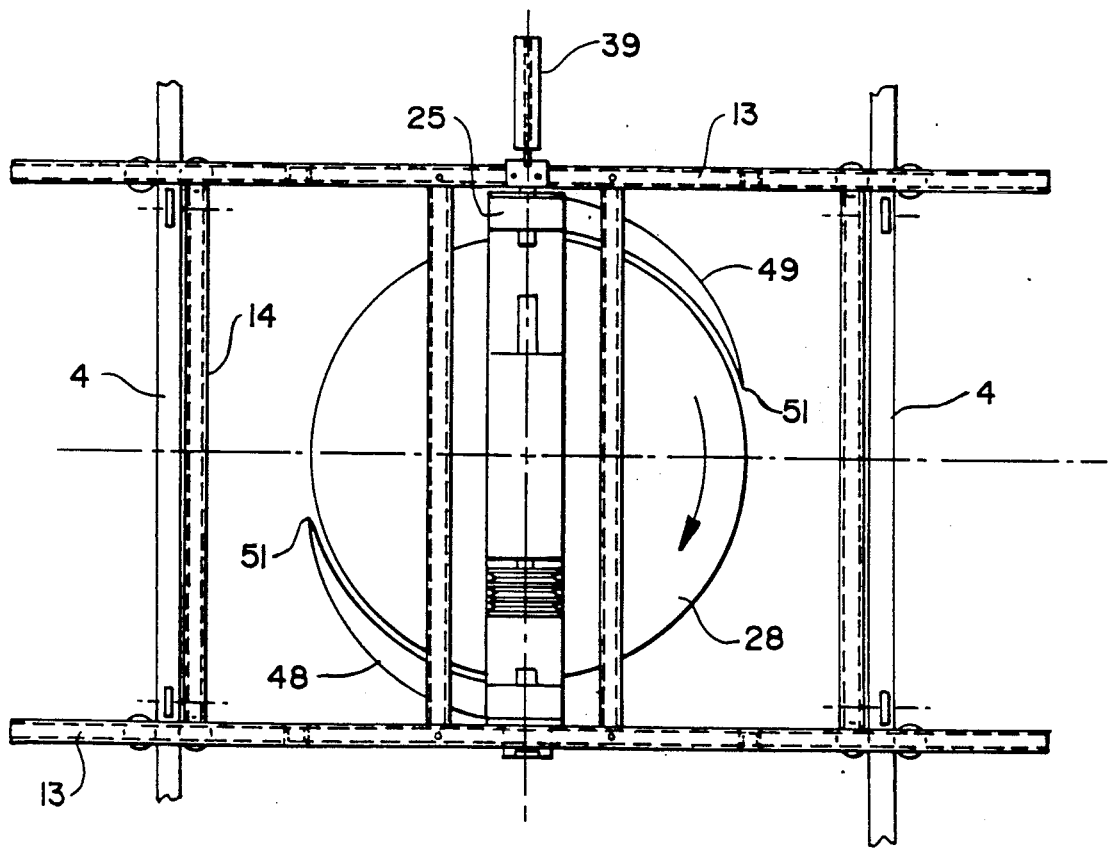
FIG. 7 is a view from above of the saw and riving knives.

The frame 10 is supported on the tracks 4 by respective groups of wheels 16 at each corner of the frame. Each group of wheels as shown in FIG. 8 comprising a pair of wheels 19 that roll on the respective opposite vertical face 17 of the track 4 and a wheel 18 which runs on the face 20 of the track. The four sets of wheels arranged in rectangular formation, firmly locate the motor and saw assembly 8 with respect to the pair of beams 15, whilst allowing the motor and saw blade assembly to freely move longitudinally in either direction along the beams 15.

Suspended generally centrally from the sub-frame 11 is a saw carrier 25, which is supported at 26 for rotation relative to the sub-frame 11, so the carrier may rotate about an axis parallel to the longitudinal direction of the beams 15, which is also the direction of travel of the motor and saw assembly 8 along the beams 15.

Journalled within the carrier 25 is the saw blade shaft 27 to which the circular saw blade 28 is detachably secured in a known manner. The shaft 27 has at the end opposite the circular saw blade 28, a bevel gear 30 meshing with complementary bevel gear 31 mounted on tho drive shaft 32 journalled in the bearings 33. The V-belt pulley 35 is also mounted on the drive shaft 32 and is coupled via the belts 36 to a similar pulley 37 on the crankshaft of the motor 12.

It is to be noted that the drive shaft 32 is co-axial with the pivotal support 26 of the carrier 25. It will therefore be appreciated that the carrier may be pivotted with respect to the sub-frame 11 with the mating bevel gears 30, 31 remaining in driving engagement. Thus the drive between the motor 12 and the saw blade 28 is maintained throughout any angular rotation of the carrier 25 and saw blade 28 relative to the sub frame 11.

The hand lever 39 is secured to the carrier 25 co-axial with the pivotal axis thereof so that the handle 39 may be gripped by the operator and angularly moved to position the saw blade in the required operating plane. A suitable spring latch 38 of known construction is provided to secure the handle in a plurality of selected positions relative to the frame 10, thereby the axis of the saw blade is set in designated positions.

Figure 2:
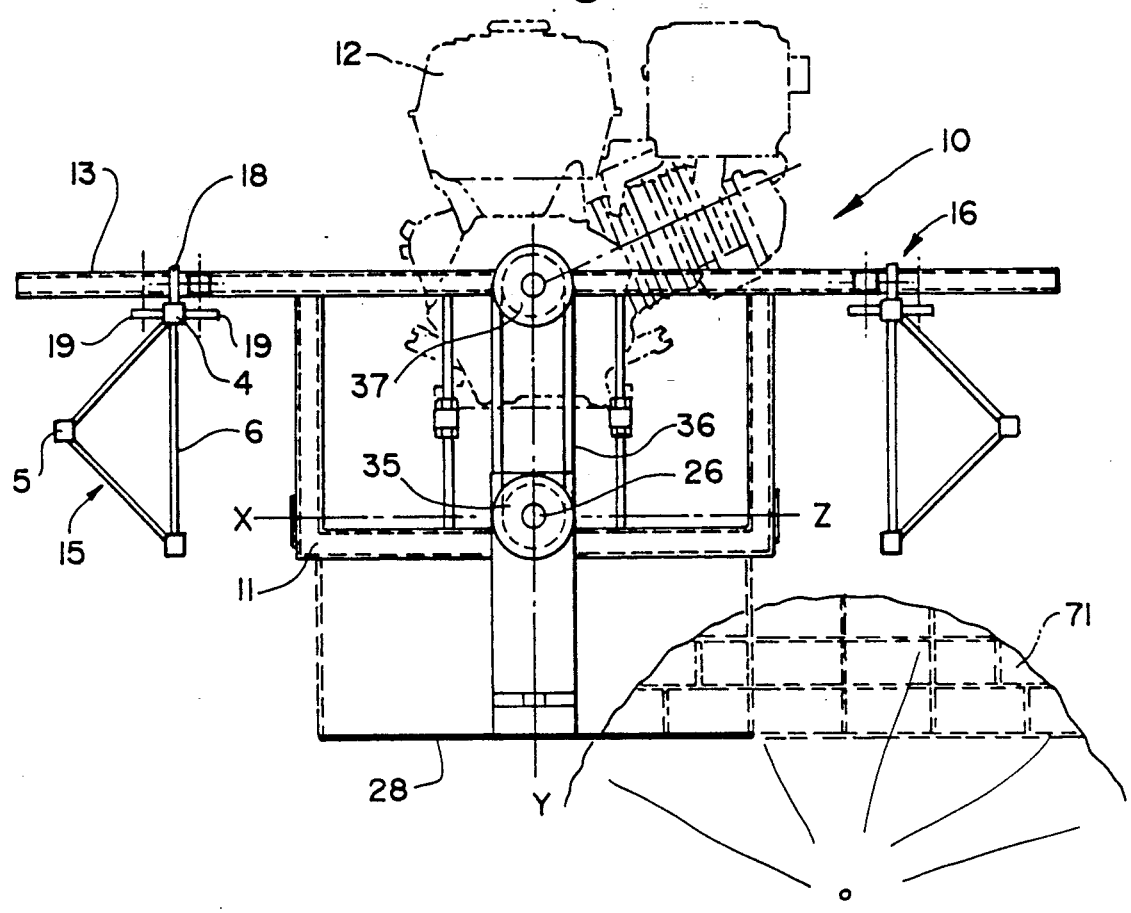
FIG. 2 is a side view of the motor and saw assembly supported on a pair of rails.
Figure 3:
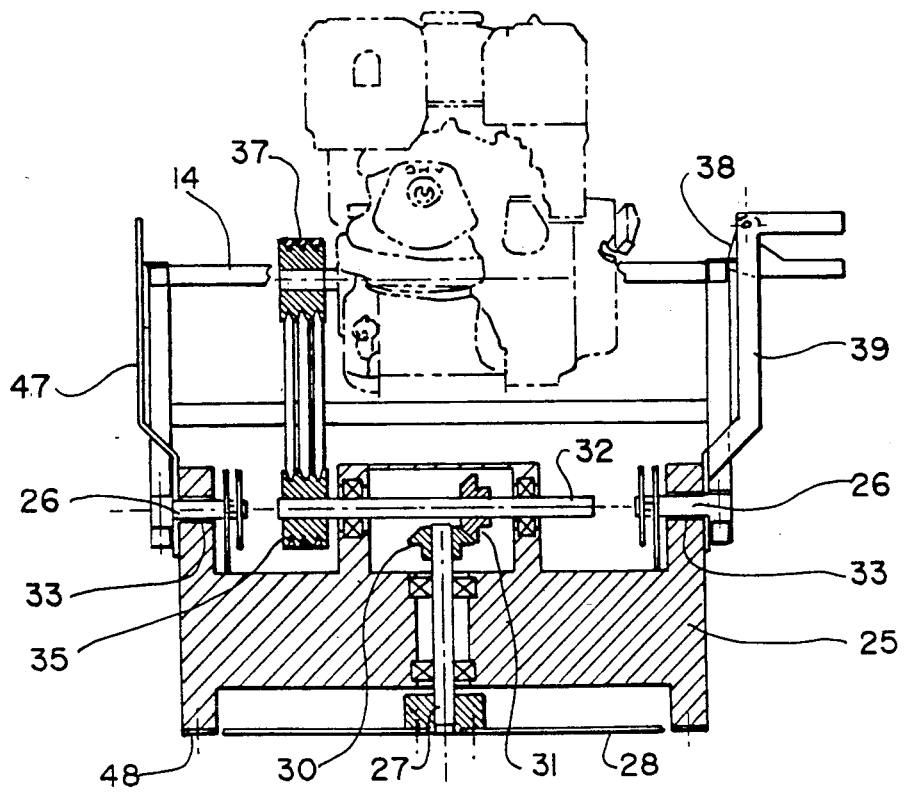
FIG. 3 is an end view of the motor and saw assembly with the blade carrier in section.

In FIGS. 1 and 2 the saw blade 28 is shown located in a generally horizontal plane for rotation about a vertical axis. However, by suitable operation of hand lever 39, the carrier 25 and the saw blade 28 can be rotated in either direction through 90° from the position shown in FIG. 1, and can be operated in any one of these three positions.

It is proposed that the saw bench be constructed in a portable form for ease of transportation, and so that it can be conveniently erected in relation to a log to be sawn, while the log remains at rest on the ground, such as in the state that it is found in the bush.

As can be seen from the accompanying drawings and the above description, the motor and saw assembly 8 freely rests on the tracks 4 forming part of the beams 15 so that it may be moved longitudinally therealong. However, it may also be readily removed therefrom by vertically lifting the frame 10 to a height so that the carrier 25 and saw blade 28 are clear of the top of the frames. This lifting of the motor and saw assembly can be conveniently achieved by respective persons lifting the frame 10 at either end thereof, and for this purpose the ends of the bars 13 of the frame 10 may be adapted for convenient hand gripping.

Figure 4:
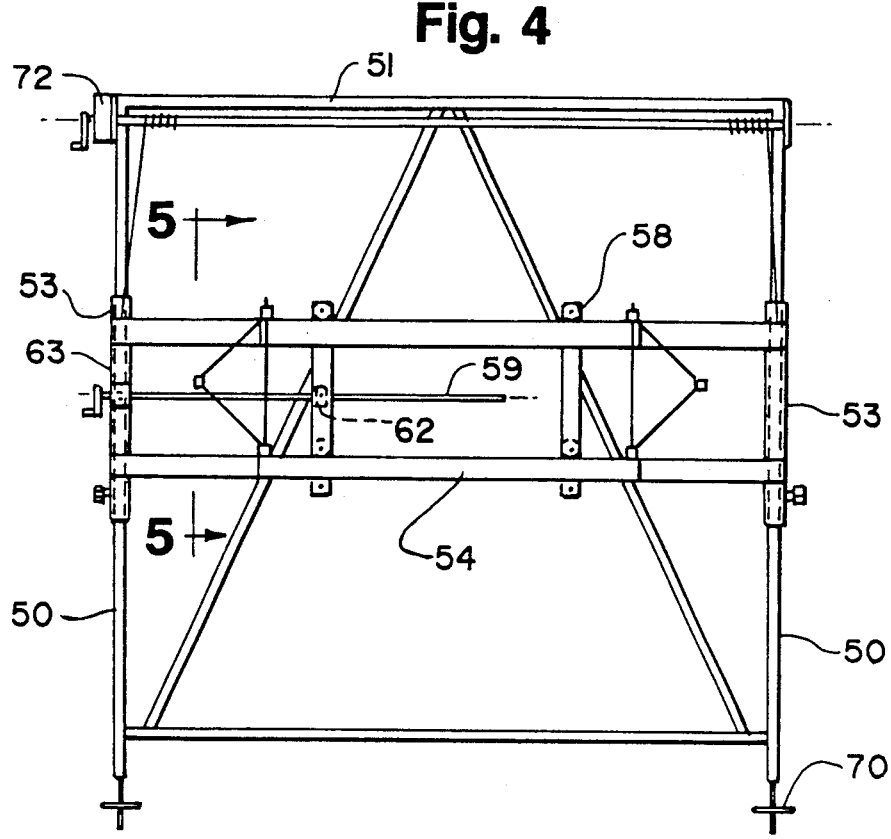
FIG. 4 is a side view of an end cross frame and beam carrier.

The beams 15 are supported at either end by respective end frames 9, one of which is illustrated in FIG. 4 of the drawings and comprise two uprights 50 interconnected by upper and lower cross-members 51 and 52 so as to form a generally rigid rectangular frame. The uprights 50 have supported thereon for vertical sliding movement a cross frame 54, having a sleeve 53 at either end which are slidably received on the uprights 50. A lock bolt 55 is threadably engaged in each of the sleeves 53, whereby the height of the cross-frame 54 may be set and the lock bolts tightened onto the uprights 50 to lock the cross-frame in position.

The cross-frame 54 includes two horizontal bars 56 and 57 secured to the sleeves 53, and upon which the beam carrier 58 is slidably mounted. The screwed rod 59 engages the nut 63 fixed to the beam carrier 58, and is journalled at 62 in the cross-frame 54. By operating the cranked end of the rod 59, the lateral position of the beam frame on the cross-frame may be adjusted. It will be observed from the above described construction of the end frames 9 that the beam carrier 58 may be adjusted in height with respect to the ground and horizontally with respect to the frame 9 into any one of a plurality of positions.

Figure 5:
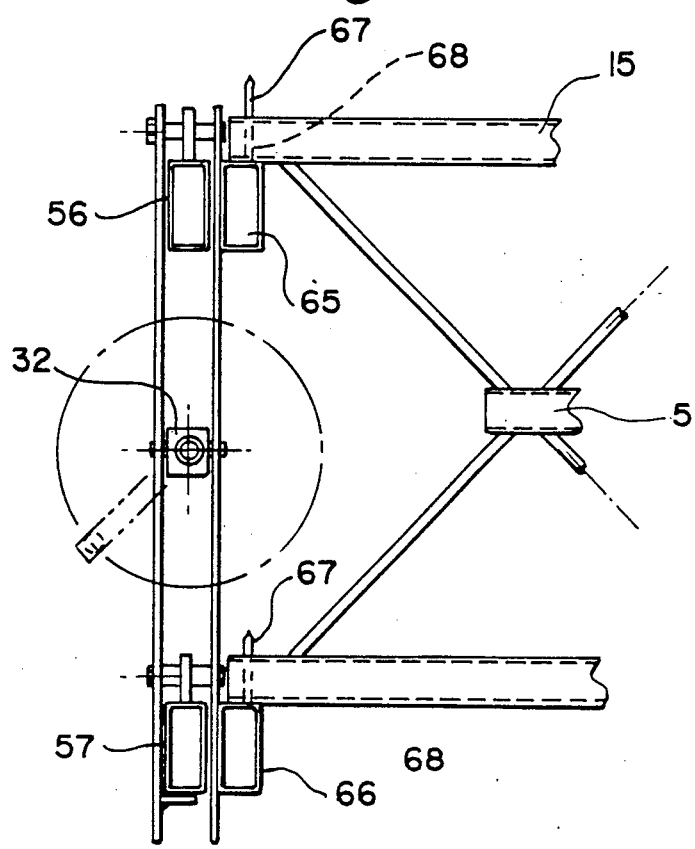
FIG. 5 is a sectional view of portion of the cross frame line 4-13 4 in FIG. 4 with a rail fitted thereto.

As can be seen in FIG. 5, the beam carrier 58 is provided adjacent each end with of the upper and lower bars 65, 66 upwardly projecting rigid pins 67 with the pins in the lower bar axially aligned with the pins in the upper bar. Each of the beams 15 are provided with vertically aligned apertures 68 dimensioned to receive the complementary pins 67 on the beam carrier 58. It will thus be seen that the respective ends of the beams 15 can be removably attached to the beam carrier 58 of each of the pair of end frames 9 so that the beams 15 will maintain the tracks 4 carried by the beams in a parallel disposition in a common generally horizontal plane. It will further be seen that once the beams 15 have been assembled to the respective end frames, the height of the tracks 4 above the ground, and the lateral position thereof, can be adjusted by the height adjustment of the cross beams 54 on the end frmes, and the lateral adjustment of the beam carriers 58 on the cross beams.

The lower ends of the uprights 50 preferably include a spike 69 for penetrating the ground, and may include a pressure plate 70 to stabilise the spike when pushed into the ground. The spikes may be detachable secured to the lower end of the uprights 50 for convenience in transportation, and adjustable to allow for sloping or uneven ground surfaces.

With the above described end frames 9 and longitudinal beams 15, the motor and saw assembly 8 may be assembled as shown in FIG. 1 to operate on a log lying on the ground in the natural bush. The two end frames 9 are erected at an appropriate distance apart, corresponding to the length of the beams 15 with the log to be sawn between the two end frames 9. The beams 15 are then assembled to the end frames and the motor and saw assembly positioned on the tracks 4. Thereafter, the operator may adjust the height and lateral position of the motor and saw assembly 8 with respect to the log to be operated on, a typical, position of the log being shown at 71 in FIG. 2. As the sawing operation proceeds and sections of the log are removed as regular shaped lengths of timber, the frame carriers 58 may be re-positioned both laterally and vertically with respect to the end frames 9, to permit the saw blade to progressively work on the whole of the log.

It is to be noted that when the saw blade 28 is in the position as indicated at X in FIG. 2, the direction of movement of the saw blade along the log to effect cutting thereof is opposite to that when the saw blade is in position Z indicated in FIG. 2. When the saw blade is in position Y, if the saw is cutting on the right hand side, it is moved along the log in the same direction as in position Z, and when cutting on the left hand side is moved in the opposite direction. The change in the required direction of movement may be used to advantage by effecting cuts in the log in each direction of movement along the beams 15 without a waste of time effecting return movements that are not cutting strokes.

In view of the combined weight of the cross beams 54, the longitudinal beams 15 and the motor and saw assembly 8 seated thereon, it is preferable to incorporate in the end frames 9 a winch mechanism as indicated diagrammatically at 72 to assist in the raising and lowering of the cross-beams 54 when the height of the motor and saw assembly is being adjusted.

Figure 6:
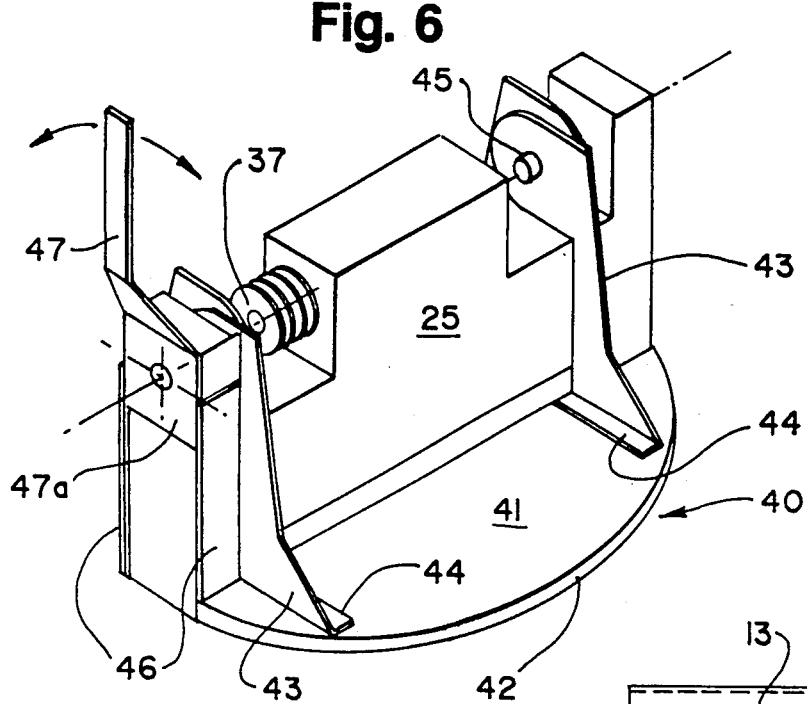
FIG. 6 is a perspection view of the carrier saw guard.

In order to reduce the risk of accidental contact with the saw blade 28, two guards are provided, one as indicated at 40 in FIG. 6 and a mirror image thereof on the opposite side of the carrier 25. Each of the guards comprises a substantially semi-circular plate 41, of a diameter slightly larger than that of the saw blade, with an integral peripheral lip 42. The lip 42 is of a width selected so that when the plate 41 is in the operative position parallel to the saw blade 28 the teeth of blade are covered by the lip.

Each plate 41 is supported by a pair of spaced arms 43 secured at 44 to the plate and pivotally connected at 45 to the carrier 25 on an axis co-axial to or parallel with the pivotal connection between the carrier and the subframe 11. Each of the arms 43 has, adjacent the hand lever 47, a flange 46 that abuts the carrier 25 when the plate 40 is in the parallel relation with the saw blade 28 with the teeth of the blade covered. Preferably the one or both of the arms are spring loaded towards the position of contact of the edge portion 46 with the carrier 25.

Depending upon the plane in which the saw blade is located and the direction in which it is advancing along the log being cut, the relevant guide is lifted to expose the teeth of the saw blade. The lifting of the control is by the hand lever 47 pivotally mounted on the carrier 25 co-axial with the pivot axis of the arms 43 but independently rotatable. When the lever 47 is moved in either direction for the central position shown, the below centre portion 47a thereof with contact respectively the flanges 46 to raise the respective guards 40.

Also provided on the carrier 25 are a pair of riving knives 48, 49 which lie in the plane of the saw blade. The knives extend about the periphery of the blade from the carrier through an arc of about 70° in the direction of rotation of the saw blade. The knives are spaced from the periphery of the saw blade and shaped so that the tip 51 of each is spaced lateral from the axis of the blade at distances not less than the radius of the saw blade. Further the material from which the knife is made is less than the width of the cut made by the saw so that the knife may pass freely along the cut. The function of the knives 48 and 49 is to ensure that the saw blade cannot cut in a log if the blade is presented to the log from the wrong direction in relation to the direction of rotation of the saw blade.

The above described saw mill enables rough logs to be reduced to lengths of regular shaped timber with a minimal of handling of the logs and in particular without having to transport the logs to a large saw mill installation or the like, or a central sawing facility. Further, the ability to be able to operate the saw in different planes enables the sawing of regular shaped lengths of timber to be carried out without moving the raw log, which is generally of a substantial weight, and with greater accuracy, as the beams supporting the motor and saw assembly can be accurately positioned with respect to the log to be sawn. Further, the saw mill is conveniently transportable as it can be readily disassembled into a number of individual components which are conveniently transportable in a utility, small truck or trailer.

We claim:

1. A saw mill for cutting timber, having a motor and saw assembly mounted for linear movement along a support frame, said assembly including a motor coupled to a circular saw blade to drive said saw blade for rotation about an axis, at least said saw blade of said assembly being mounted for selective adjustment among three positions, comprising a first position with said rotation axis of the saw blade substantially vertical and second and third positions wherein in each of said second and third positions said rotation axis of the saw blade is substantially horizontal and displaced from the first position in respective opposite directions from said first position through 90°, said rotation axis remaining substantially perpendicular to the direction of said linear movement in each of said first, second and third positions.

2. A saw mill as claimed in claim 1, wherein the saw blade is coupled to the motor to move independently of the motor among said first, second and third positions.

3. A saw mill as claimed in claim 1, wherein the saw blade is mounted for pivotal movement among said positions about a pivot axis oriented parallel to the direction of said linear movement of the motor and saw assembly along said support frame.

4. A saw mill as claimed in claim 1 or 2, wherein the support frame includes a pair of parallel rails and the motor and saw assembly includes a transport frame having a plurality of wheels mounted thereon and arranged to engage said parallel rails to guide the transport frame therealong.

5. A saw mill as claimed in claim 4 wherein the motor is fixedly mounted on said transport frame and said saw blade is supported on a shaft journaled in a carrier mounted in the transport frame for relative angular movement about a pivot axis oriented parallel to the direction of movement of the transport frame along the rails.

6. A saw mill as claimed in claim 5, wherein the carrier has a drive shaft journaled therein coaxial with the pivot axis of the carrier, said drive shaft being drivingly coupled to the motor, with said shaft that supports the saw blade and said drive shaft carrying respective meshing drive gears.

7. A saw mill as claimed in claim 5, wherein means are provided to releasably lock said carrier in preset positions relative to the transport frame whereby the saw blade is located in said first, second and third positions respectively.

8. A saw mill for cutting timber, having a support frame comprising a pair of substantially horizontal, laterally spaced, parallel beams, each beam having opposed ends and being supported only at its respective opposed ends and fixed in said lateral spacing, each beam including a rail extending longitudinally of said beam, said rails being parallel to each other and located in a common, substantially horizontal plane, a transport frame supported on said rails for linear movement therealong in either longitudinal direction, a motor and saw assembly mounted on said transport frame and including a motor and a circular saw blade drivingly coupled to said motor for rotation about an axis and with the saw blade located between said laterally-spaced beams, and said saw blade being supported for selective location in either one of a first and a second preset operation position relative to the transport frame in each of which the saw blade rotates in a different vertical plane, both said vertical planes being parallel to the direction of linear movement of the transport frame along the rails, the saw blade remaining drivingly coupled to the motor in each operation position and being movable between said operation positions independently of the motor.

9. A saw mill as claimed in claim 8, wherein the saw blade is also selectively locatable in a third preset operation position wherein the axis of rotation of the saw blade is substantially vertical.

10. A saw mill as claimed in claim 8 or 9, wherein said beams are individually demountably attached at each opposed end to respective ground engaging end frames.

11. A saw mill as claimed in claim 10 wherein said beams are demountably attached at each opposed end thereof to respective carrier frames, each carrier frame being mounted on the respective end frame for independent movement relative thereto in the vertical direction and in a horizontal direction transverse to the direction of movement of the transport frame along said rails.

12. A saw mill as claimed in claim 11, wherein the motor is fixedly mounted on the transport frame, and said saw blade is supported on a saw blade shaft journaled in a member mounted in the transport frame for relative angular movement about a pivot axis oriented parallel to the direction of movement of the transport frame along the rails.

13. A saw mill as claimed in claim 17, wherein the member has a drive shaft journaled therein coaxial with the pivot axis of the member, said drive shaft being drivingly coupled to the motor, with said saw blade shaft and said drive shaft carrying respective meshing drive gears.

14. A saw mill as claimed in claim 13, wherein means are provided to releasably lock said member in respective preset positions relative to the transport frame whereby the saw blade is located in said respective preset operation positions of the saw blade.

15. A saw mill as claimed in claim 8 or 9 wherein the motor is fixedly mounted on the transport frame, and said saw blade is supported on a saw blade shaft journaled in a member mounted in the transport frame for relative angular movement about a pivot axis oriented parallel to the direction of movement of the transport frame along the rails.

16. A saw mill as claimed in claim 15, wherein the member has a drive shaft journaled therein coaxial with the pivot axis of the member, said drive shaft being drivingly coupled to the motor, with said saw blade shaft and said drive shaft carrying respective meshing drive gears.

17. A saw mill as claimed in claim 16, wherein means are provided to releasably lock said member in respective preset positions relative to the transport frame whereby the saw blade is located in said respective preset operation positions of the saw blade.

* * * * *